United States Patent Office 2,820,813
Patented Jan. 21, 1958

2,820,813

PRODUCTION OF ESTERS OF HYDROXY COMPOUNDS

Curtis W. Smith, Berkeley, Calif., assignor to Shell Development Company, New York, N. Y., a corporation of Delaware No Drawing. Application December 30, 1954
Serial No. 478,888

16 Claims. (Cl. 260—465.4)

This invention relates to the synthesis of carboxylic acid esters of mono- and poly-hydric alcohols. It deals with a new method for producing these esters from ethylenically unsaturated compounds and peroxy-substituted cyclic ethers. The invention has as a further object the provision of new long chain diols having two non-conjugated ethylenic double bonds.

Milas, Peeler and Mageli have shown in the Journal of the American Chemical Society, vol. 76, pages 2322–2325 (May 5, 1954), that the peroxy-substituted cyclic ether, 2-hydroperoxytetrahydropyran, reacts with ferrous sulfate, a redox reducing agent, to produce omega-valerolactone. We have found that this reaction can take a different course and that in the presence of an ethylenic compound coupling via a carbon-to-carbon bond occurs between the ether and the ethylenic compound with formation of a carboxylic acid ester of a mono- or poly-hydroxy alcohol. This new reaction is a general one and the invention broadly comprises contacting an alpha-peroxy-substituted cyclic ether, that is, a cyclic ether having a peroxy group directly linked to one of the ring carbon atoms to which the ether oxygen atom is directly attached, with a redox reducing agent and an ethylenic compound free of reactive groups other than the ethylenic unsaturation, in a solvent for the reactants, whereby a carboxylic acid ester of an alcohol is formed.

While the invention is not to be limited to any theory of the mechanism of the new reaction, it has been found that the following sequence of possible reaction steps will account for the esters which are obtained in the process. According to this theory, the first step in the reaction is formation of a radical (II) such as might be produced from the starting alpha-peroxy-substituted cyclic ether (I) through opening of a carbon-to-carbon bond linking the peroxy-substituted carbon atom to an adjacent ring carbon atom and simultaneous breakage of the oxygen-to-oxygen bond of the peroxy group of the alpha-peroxy ether. This radical can undergo various reactions including addition to an ethylenic double bond of the ethylenic reactant. Such addition to the ethylenic reactant can be postulated as producing another radical (VII) which undergoes further reactions such as combination with radical (II), disproportionation or hydrogen abstraction in which the hydrogen donor can be the solvent or another organic compound present in the mixture, and dimerization. The reactions can be represented as taking place as follows:

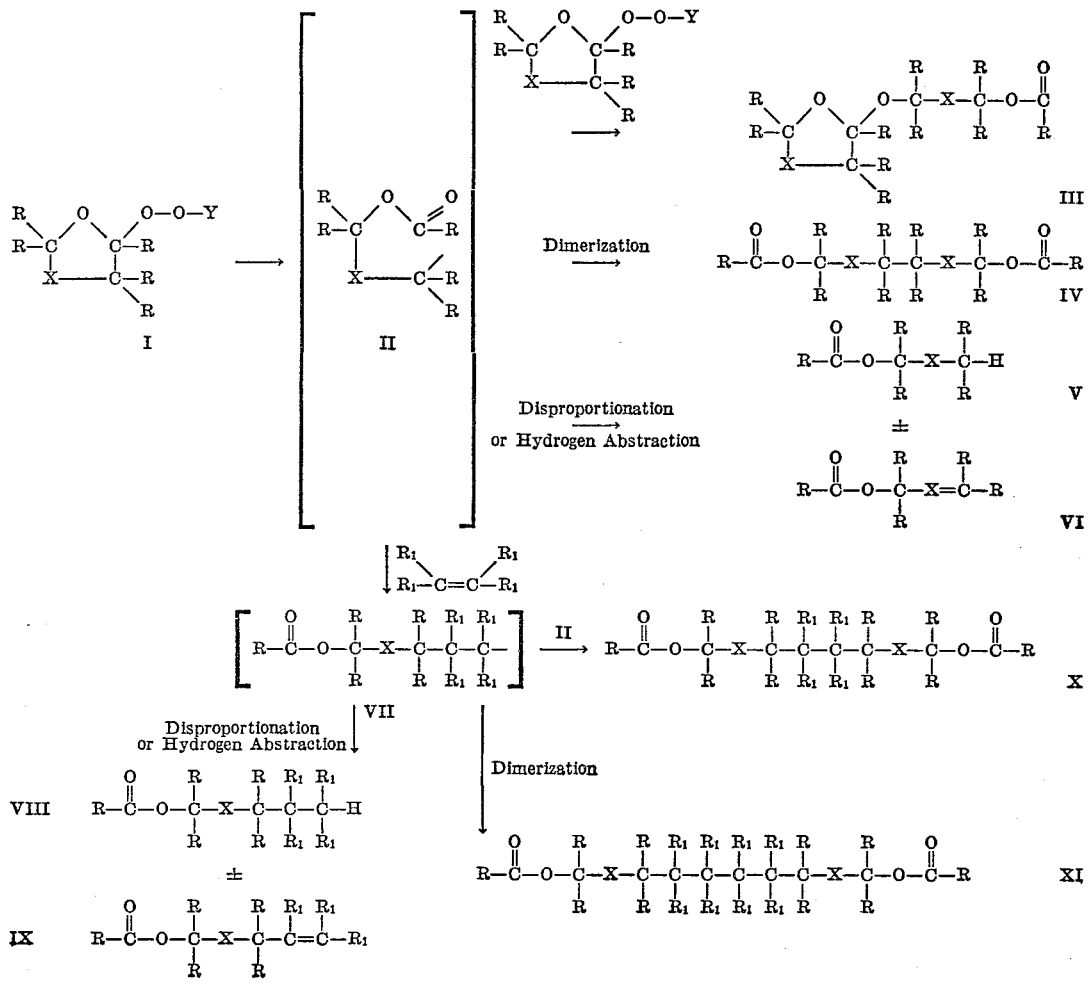

In these formulae the R's and R₁'s represent hydrogen atoms or the same or different organic radicals having their free valence bonds attached to carbon atoms, X represents a divalent radical having its two free valence bonds attached to the same or different carbon atoms, preferably a divalent hydrocarbon radical having 1 to 15 carbon atoms in the unsubstituted portion of the diradical, and Y represents a hydrogen atom, a hydrocarbon radical or a

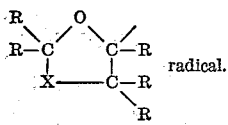 radical.

As a rule, mixtures of two or more of the indicated carboxylic acid ester products of coupling between the ethylenic compound and alpha-peroxy cyclic ether will be obtained. The relative proportions of these products will vary with the method employed in carrying out the process and with the nature of the ethylenic compound chosen as starting material. The reaction can be carried out in the absence of an ethylenic reactant to obtain the dimer IV as the predominant and often the sole product. Among the products of disproportionation or hydrogen abstraction obtained when reacting in the absence of an ethylenic compound, the saturated ester of a monohydric alcohol V generally predominates over the unsaturated ester VI, particularly when the reaction is carried out in the presence of an organic compound, for instance, an alcohol solvent, which is a hydrogen donor. When reacting in the presence of an ethylenic compound, the formation of products such as III, IV, V and VI derived solely from the cyclic ether can be minimized or even substantially eliminated, particularly when using the preferred conjugated dienes as the ethylenic reactant.

When, as is generally preferred, conjugated dienes are used as the ethylenic component of the reaction mixture, the predominant products are the 2:1 and 2:2 adducts which will be mixtures of esters of isomeric ethylenic diols. These isomers result from the fact that both 1,4- and 1,2-addition reactions of the diene can occur in the process. Thus, when employing 1,3-dienes of the formula

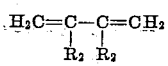

where R₂ is hydrogen halogen, alkyl, aryl or aralkyl, which are especially advantageous types of conjugated dienes for use in the new process, one obtains the following isomeric 2:2 adducts (two moles of starting alpha-peroxy cyclic ether combined with two moles of starting diene):

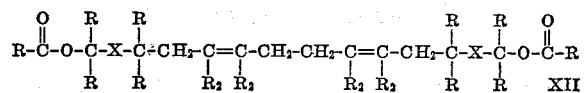

XII

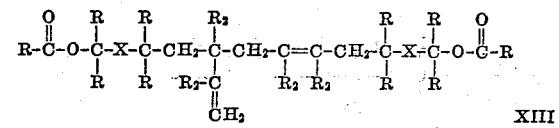

XIII and

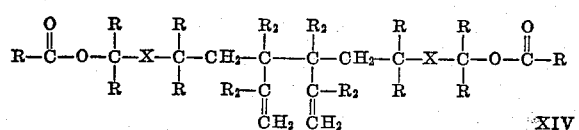

XIV

The diester of the diol having both ethylenic groups in the main chain is the chief 2:2 adduct. The isomeric 2:1 adducts simultaneously produced, generally in somewhat lower amounts, will be chiefly:

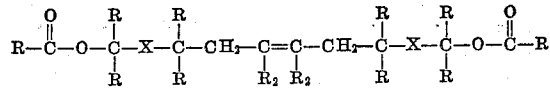

and

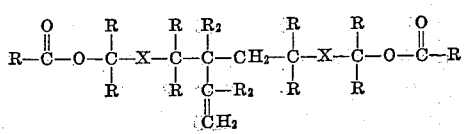

where again the product having the ethylenic group in the main chain of the diol is the predominant isomer.

Monoethylenic compounds or compounds having isolated ethylenic double bonds are less reactive in the new process than the preferred conjugated dienes and tend to yield considerable amounts of 1:1 adducts, especially esters of saturated alcohols VIII when the reaction is conducted in the presence of a hydrogen donor, in addition to the 2:1 and 2:2 adducts X and XI. The order of addition of the reactants to the reaction mixture influences the relative proportions of these different types of adducts and can be used to control the composition of the product mixture. For instance, addition of a solution of the redox reducing agent to a solution of the alpha-peroxy cyclic ether and ethylenic compound favors the formation of the 2:1 adduct X (two moles of starting alpha-peroxy cyclic ether combined with one mole of starting ethylenic compound) and the 2:2 adduct XI at the expense of the 1:1 adducts VIII and IX. The reverse order of addition, i. e. addition of the peroxy-cyclic ether to the ethylenic compound results in increased yields of 1:1 adducts, among which the saturated product VIII usually predominates.

The mixtures of esters which are thus often obtained in the process of the invention find many uses without separating the components. However, it is usually advantageous to separate the mixed products into fractions having the same number of carbon atoms per molecule by fractional distillation or other suitable methods. These fractions can be further treated to separate the branched chain from the straight chain isomers. Chromatographic or other separation methods can be used for resolving the mixtures. For most uses, the mixtures of esters having the same number of carbon atoms per molecule are more advantageous than the individual components due to the lower melting point of the mixtures.

As previously indicated, the new reaction is carried out under redox conditions, the term "redox" denoting an oxidation-reduction reaction in which an electron transfer takes place with formation of a free radical. Any of the reducing agents applicable in redox reactions can be used in the present case as reducing agents for the alpha-peroxy cyclic ether employed. It has been found that ferrous ion is a particularly useful reducing agent in the reaction, but ions of other heavy metals having multiple valences can likewise be used. Examples of such suitable metal ions are chromous, vanadous, cobaltous, cuprous, manganous and like ions. Other types of reducing agents which are suitable are, for instance, sodium bisulfite, sodium formaldehyde sulfoxylate, 1-ascorbic acid, one or more reducing sugars or the like, these reducing agents being most advantageously employed together with a small amount of ferrous or ferric or other multivalent metal ion to act as a promoter which is maintained in the reduced state by the other reducing agent present.

The reducing agent or mixture of reducing agents used are employed in an amount about equivalent to, or preferably in excess of, for instance, up to about 10% excess over, the stoichiometric requirement for the reduction of the alpha-peroxy cyclic ether present. It is usually also desirable to employ the alpha-peroxy cyclic ether and ethylenic compound in about the stoichiometric proportions required for the desired product but an excess of either of these reactants can be used in the reaction, suitable proportions being about 0.25 to about 5 moles, most preferably about 1 to about 3 moles, of ethylenic compound per mole of alpha-peroxy cyclic ether used.

The reaction is advantageously carried out under acidic conditions. It is usually desirable to add a part of the acid to a solution of the alpha-peroxy cyclic ether in the chosen solvent, about 0.5 to 2 equivalents of acid being suitable, and introduce the remaining acid, preferably about 0.5 to 2 equivalents of acid per mole of alpha-peroxy cyclic ether, with the reducing agent. Sulfuric acid is an economical and effective acidifying agent, but other acidic compounds, preferably inorganic acids such as hydrochloric, phosphoric and like acids, can be used, and also it is feasible to operate under neutral or basic reaction conditions, although as a rule these are less desirable with respect to yield and purity of product.

A mutual solvent for the reactants is also useful in the reaction. Organic solvents, which can be aqueous or anhydrous, can be used. Alcohols such as methyl, ethyl, isopropyl and tertiary butyl alcohols, or ethers, for instance, diethyl ether, dioxane, etc., or esters, as methyl or ethyl acetates, for example, benzene, can be employed as the reaction media which may also be water. When the reactants cannot be conveniently brought into mutual solution, they can be reacted in an emulsified state.

Temperatures of the order of about −15° C. to about 50° C., more preferably temperatures in the range of about 0° C. to about 25° C., are suitable for the reaction, which is advantageously carried out at a pressure sufficient to maintain a liquid phase present and may be atmospheric or higher or lower pressures. The reaction is relatively rapid at these temperatures, and reaction times of about 30 minutes to about 240 minutes are usually sufficient for satisfactory conversions and yields of desirable products.

Various methods of carrying out the process of the invention can be employed—continuous, intermittent or batch operation being satisfactory. Since some of the alpha-peroxy cyclic ethers are explosive, the customary precautions in handling these compounds must be observed. One method which has been found useful in operating on a continuous scale is to continuously feed a solution of the alpha-peroxy cyclic ether chosen as starting material, and preferably acidified as previously indicated, into a closed, stirrer mixer into which the ethylenic compound to be reacted therewith is also fed in and dissolved under rapid stirring and cooling. The resulting solution of the two reactants is continuously withdrawn and fed, together with a solution of the chosen redox reducing agent, preferably an acidified aqueous solution ferrous sulfate, through a reaction coil provided with a jacket through which a temperature regulating medium is circulated, the rate of flow being controlled so as to insure mixing and a proper period of reaction. A similar order of addition of the reactants can be used in batchwise operation, or in either case the reactants can be introduced in other ways, although such are generally less desirable.

Recovery and purification of the esters produced by the new method can be carried out in any suitable way. Extraction with an appropriate solvent for the product is one method which has been found useful. Instead of recovering the esters as such, they can be hydrolyzed and the corresponding alcohols and carboxylic acids can be separately collected. Altenatively, one can subject the ester products to acid exchange, for example, by reaction under acidic conditions with a higher boiling carboxylic acid while distilling off the lower boiling acid produced, and recovering the new ester formed.

The following examples illustrate in more detail suitable methods of carrying out the new process and show some typical new diols which can be produced.

*Example I*

2-hydroperoxytetrahydropyran was reacted with butadiene and ferrous sulfate heptahydrate as follows:

To a mixture of a solution of 55 g. of ferrous sulfate heptahydrate in 300 cc. of water and 20 g. of butadiene at −5° C. was added with stirring a solution of 20 g. of 2-hydroperoxytetrahydropyran in 100 cc. of methyl alcohol. The addition required one hour, during which time the temperature was maintained in the range −5° C. to +5° C.

The unreacted butadiene was allowed to evaporate from the reaction mixture and the reaction mixture was extracted with ethyl ether.

Distillation of the ether extract resulted in the isolation of four fractions distilling at 100° C. or greater at 1 mm. Hg. pressure.

A. Omega-(2-tetrahydropyranyloxy)-n-butylformate:
   B. P. 100–134/1 mm_____grams__ 0.7
   Carbon-hydrogen:
      Analysis C—60.2, H—9.0
      Calculated C—59.5, H—8.9
B. Diformate of 6-dodecene-1,12-diol:
   B. P. 135–140/1 mm_____grams__ 2.9
   Carbon-hydrogen:
      Analysis C—66.0, H—9.9
      Calculated C—65.6, H—9.5
   Saponification equivalent_____ 140
   Calculated for $C_{14}H_{24}O_4$_____ 128.1
C. Mixture of the diformates of 6,10-hexadecadiene-1,16-diol and 6-vinyl-8-tetradecene-1,14-diol with a small amount of 6,7-divinyldodecane-1,12-diol:
   B. P. 40–170/1 mm_____grams__ 2.1
D. The diformate of 6,10hexadecadiene-1,16-diol:
   B. P. 171–175/1 mm_____grams__ 3.4
   Carbon-hydrogen:
      Analysis C—70.0, H—9.9
      Calculated C—69.6, H—9.7
   Saponification equivalent_____grams__ 157
   Calculated for $C_{18}H_{20}O_4$_____do____ 155.9

The same products are obtained when tert-butyl-2-tetrahydropyranyl peroxide is substituted for the 2-hydroperoxytetrahydropyran in the foregoing reaction.

*Example II*

Using isoprene in equal molecular amount in place of butadiene in the method of Example I gives as the predominant product the 2:2 adduct which is a mixture made up chiefly of diformates of 6,10-, 6,11- and 7,10-dimethyl-6,10-hexadecadiene-1,16-diols and isomers resulting from 1,2-addition of the isoprene, including 6-vinyl-6,8-dimethyl-8-tetradecene-1,14-diol, 6-isopropenyl-8-methyl-8-tetradecene-1,14-diol and 6-vinyl-6,9-dimethyl-8-tetradecene-1,14-diol, together with the 2:1 adducts, principally 6-methyl-6-dodecene-1,12-diol diformate, 5-vinyl-5-methyldecane-1,10-diol formate and 5-isopropenyldecane-1,10-diol diformate.

Substituting chloroprene for butadiene under the same conditions results in the production of diformates of dichloro-6,10-hexadecadiene-1,16-diols and isomers as the 2:2 adducts. At the same time, 6-chloro-6-dodecene-1,12-diformate and isomers are obtained as the 2:1 adduct.

*Example III*

For the reaction of dimethyl maleate with 2-hydroperoxytetrahydropyran and ferrous sulfate, a solution of the peroxy cyclic ether is prepared by adding to 50 g. of concentrated sulfuric acid (1 mole), in 750 ml. of methanol, 168 g. (2.10 moles) of dihydropyran. This solution is added dropwise over a two-hour period with stirring and cooling to 292 g. (1.05 moles) of ferrous sulfate heptahydrate, 850 ml. of water, 150 g. of concentrated sulfuric acid, 180 g. (1.25 moles) of dimethyl maleate and 300 ml. of methanol. On completion of the reaction, extraction with ether followed by fractionation affords a 1:1 adduct, principally methyl 2-carbomethoxy-6-formoxyhexanoate and, in somewhat higher yield, the 2:2 adduct, 5,6,7,8-tetracarbomethoxy-1,12-diformoxydodecane.

Reacting under the same conditions but adding the ferrous sulfate solution to the 2-hydroperoxytetrahydropyran-dimethyl maleate solution, again over a two-hour period, gives the same 2:2 adduct, together with the 2:1 adduct, 5,6-dicarbomethoxy-1,10-diformoxydecane, and a minor amount of the 1:1 saturated adduct.

Reacting methyl methacrylate in the same way affords the 1:1 adduct, methyl 2-methyl-7-formoxyheptanoate; the 2:1 adduct, 5-methyl-2-carbomethoxy-1,10-diformoxydecane; and the 2:2 adduct, 6,7-dimethyl-6,7-dicarbomethoxy-1,12-diformoxydodecane.

Example IV

Using the method of Example III with alpha-methyl styrene in place of the dimethyl maleate and adding the ferrous sulfate heptahydrate solution to the 2-hydroperoxytetrahydropyran and alpha-methyl styrene-containing solution results in the production of 6-phenylheptyl formate (1:1 adduct) as the chief product, together with the 2:1 and 2:2 adducts, 5-methyl-5-phenyl-1,10-diformyloxydecane and 6,7-dimethyl-6,7-diphenyl-1,12-diformyloxydodecane.

Example V

Under the conditions of Example IV methacrylonitrile reacts with 2-hydroperoxytetrahydropyran and ferrous sulfate to give a 1:1 adduct, 6-cyanoheptyl formate; a 2:1 adduct, 5-methyl-5-cyano-1,10-diformyloxydecane; and a 2:2 adduct, 6,7-dimethyl-6,7-dicyano-1,12-diformyloxydodecane.

Example VI 2-hydroperoxy-2-methyltetrahydropyran reacted with butadiene and ferrous sulfate as in Example I gives the diacetates of 6,10-hexadecadiene-1,16-diol and isomers as the 2:2 adduct, together with the 2:1 adduct, the diacetate of 6-dodecene-1,12-diol and isomers.

Example VII 2-hydroperoxy-2-methyl-2,5-dihydrofuran, prepared by treating 2-methylfuran with an equimolar amount of 30% hydrogen peroxide, reacts with butadiene under the conditions of Example I to give as the chief products the 2:1 adduct, 1,10-diacetoxy-2,5,8-decatriene, and the 2:2 adduct, 1,14-diacetoxy-2,5,9,12-tetradecatetrene.

Example VIII

From monohydroperoxydioxane and butadiene and ferrous sulfate under the conditions of Example I the chief products are the 2:1 adduct, 3,10-dioxa-6-dodecene-1,12-diol diformate $$\overset{O}{\underset{\|}{H-C}}-O-CH_2-CH_2-O-CH_2-CH_2-CH=CH-CH_2-CH_2-O-CH_2-CH_2-O-\overset{O}{\underset{\|}{C}}-H$$

and isomers, and the 2:2 adduct, 3,14-dioxa-6,10-hexadiene-1,16-diol diformate $$\overset{O}{\underset{\|}{H-C}}-O-CH_2-CH_2-O-CH_2-CH_2-CH=CH-CH_2-CH_2-CH=CH-CH_2-CH_2-O-CH_2-CH_2-O-\overset{O}{\underset{\|}{C}}-H$$

The foregoing examples are merely illustrative, the invention being broadly applicable to the reaction of alpha-peroxy-substituted cyclic ethers which have the peroxy group linked to one of the ring carbon atoms to which the ether oxygen is attached with ethylenic compounds generally using any of the reducing agents commonly employed in the redox art. Specific alpha-peroxy cyclic ethers other than those used in the examples, well adapted for use in the process, include 2-hydroperoxytetrahydrofuran, 2-hydroperoxy-2-ethyltetrahydrofuran, 2-hydroperoxy-3-methyltetrahydrofuran, methyl 2-tetrahydropyranyl peroxide, di-(2-tetrahydropyranyl)peroxide, 2-hydroperoxy-3-isopropyltetrahydropyran, 2-hydroperoxy-4-isobutyltetrahydropyran, 2-hydroperoxy-5-decyltetrahydropyran, 2-(5-hydroperoxytetrahydropyranyl)-ethyl ether, 2-(3-phenyl-5-hydroperoxytetrahydropyranyl)octadecyl ether, bis-2-(5-hydroperoxytetrahydropyranyl)ether, 2-acetoxy-5-hydroperoxytetrahydropyran, 2-hydroperoxytetrahydropyran-5-carboxaldehyde, 2-acetyl-5-hydroperoxytetrahydropyran, 2-hydroperoxy-1-oxacyclodecane, and 2-hydroperoxy-1-oxacyclotridecane.

The alpha-peroxy-substituted cyclic ethers used in the present process can be prepared by reacting the corresponding alpha,beta-ethylenic cyclic ethers with hydrogen peroxide. The Journal of the American Chemical Society, vol. 73, pages 913–914 (1951), and vol. 76, pages 1173–1174 (1954), describes a number of alpha-beta-monoethylenic furan compounds which are useful in the production of suitable peroxy-substituted tetrahydrofurans in this way. Substituted 3,4-dihydro-1,2-pyrans which can be similarly converted to useful starting alpha-peroxy cyclic ethers for use in the new process are described, for example, in U. S. Patents 2,479,284 and 2,514,168. Another method of producing alpha-peroxy-substituted cyclic ethers which can be used is by air oxidation of the corresponding saturated cyclic ethers. Whatever the method used in their preparation, it is preferred to employ alpha-peroxy-substituted cyclic ethers having four to nine carbon atoms and a single ether oxygen atom in the primary ring, and having the one remaining bond of the peroxy-substituted carbon atom linked to a hydrogen or carbon atom. When this bond is linked to hydrogen, the products will be formic acid esters of mono- or di-hydroxy alcohols. When it is a carbon atom, the products will be the corresponding esters of higher molecular carboxylic acids, acetic acid esters in the case of a methyl substituent, propionic acid esters in the case of an ethyl group, isobutyric acid esters in the case of an isopropyl group, benzoic acid esters in the case of a phenyl group, etc. Most preferably, alpha-peroxy-substituted cyclic ethers composed only of carbon and hydrogen, in addition to the ether and peroxy oxygen atoms are used, those having a total of four to twenty-five carbon atoms being suitable.

The preferred monoethylenic compounds for use in the new process are (1) those having an aromatic ring directly linked to one of the ethylenic carbon atoms as in styrene, alpha-methyl styrene, 4-methylvinyl benzene, alpha-chlorostyrene, 3-chloro-1-vinylbenzene, vinyl naphthalene, the diphenyl ethylenes, 1-phenyl-1-cyclohexene, indene and their homologues; (2) those having a carbonyl carbon atom directly linked to a carbon atom of the ethylenic group, suitable examples being (a) the alpha,beta-ethylenic aldehydes such as acrolein, alpha-chloroacrolein, methacrolein, crotonaldehyde, tiglic aldehyde, beta-methyl crotonaldehyde, alpha-ethylacrolein, 2-hexanal, alpha-beta-dicrotonaldehyde, cinnamyl aldehyde, alpha-methyl cinnamyl aldehyde, 1-formylcyclohexene-1, etc., (b) the alpha,beta-ethylenic carboxylic acids, for instance, acrylic acid, alpha-chloracrylic acid, methacrylic acid, crotonic acid, alpha-chlorocrotonic acid, angelic acid, beta,beta-dimethyl acrylic acid, 2-hexenoic acid, maleic acid, citraconic acid, dimethyl maleic acid, cinnamic acid, and the like; (c) esters of the alpha,beta-ethylenic carboxylic acids such as methyl acrylate, ethyl acrylate, isopropyl acrylate, ethyl methacrylate, isobutyl methacrylate and like esters of the other acids of group (b) above. (d) the alpha,beta-ethylenic ketones of which methyl vinyl ketone, ethyl vinyl ketone, phenyl vinyl ketone, ethyl isopropenyl ketone, mesityl oxide, propyl propenyl ketone, 4-chloro-3-nonene-2-one, 4-chloro-3-ethyl-3-hexene-2-one, 3-hexene-2,5-dione, 4-phenyl-3-hexene-2-one, methyl alpha-phenyl vinyl ketone, 2-cyclohexenone, etc. are examples; (3) the ethylenic nitriles having the nitrile group attached to one of the ethylenic carbon atoms as, for example, acrylonitrile, crotononitrile, alpha-ethyl acrylonitrile, alpha-beta-dimethyl acrylonitrile, alpha-phenyl acrylonitrile, alpha-naphthyl acrylonitrile, alpha-(2-chloro-butyl)acrylonitrile, beta-(2-chloroethyl)acrylonitrile, beta-hexyl acrylonitrile, beta-n-decyl acrylonitrile, and the like. These monoethylenic compounds react more readily in the new process and tend to give higher yields of desirable products than the simple monoethylenic compounds such as the olefins. However, other olefinic compounds such as ethylene, isobutylene, the amylenes, cyclohexene, vinylidene chloride, vinyl acetate and similar monoethylenic compounds can be used as starting materials.

As previously indicated, conjugated dienes are especially useful starting ethylenic compounds for the production of valuable ethylenic dienes. In addition to the specific dienes mentioned in the examples, the process can be carried out successfully with 1,3-pentadiene, dimethyl-1,3-butadiene, 1,3,5-hexatriene, 2-ethyl-1,3-pentadiene, 2,4-octadiene, 1,1-dimethyl-3-tertiary butyl-1,3-butadiene, 2-phenyl-1,3-butadiene, 1,4-diphenyl-1,3-butadiene, 2-benzyl-1,3-butadiene, 2-cyclohexyl-1,3-butadiene, 2-(cyclohexene-3)-1,3-butadiene, 1,1-diphenyl-3,5-hexadiene, cyclopentadiene, 1,3-cyclohexadiene, 1-methyl-2,4-cyclopentadiene, 2-methyl-1,3-cyclopentadiene, the mono- and di-methyl-1,3-cyclohexadienes, 1-vinyl-1-cyclohexene, 1-tertiary butyl-1,3-cyclohexadiene, and 1,3-cycloheptadiene are typical, and substitution products of such conjugated diolefins, having as substituents functional groups such as nitro, cyano and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadiene, 1-chloro-2-methyl-1,3-butadiene, 2-chloro-1,3-pentadiene, 1-chloro-2,4-cyclopentadiene, 1-chloromethyl-2,4-cyclohexadiene and the like, and the corresponding fluoro and bromo compounds. Other substituted conjugated diethylenic compounds which can be used successfully as starting materials are, for example, conjugated diethylenic alcohols such as 2,4-hexadien-1-ol, 1,3-hexadien-5-ol, 2,4-octadien-6-ol and 2,4,6-octatrien-1-ol, etc., ethers such as 2-methoxy-1,3-butadiene, 2-ethoxy-1,3-butadiene, 1-ethoxy-2,3-cyclohexadiene, etc., carboxylic acids of which vinyl acrylic acid, sorbic acid (2,4-hexadienoic acid), 4-methyl-2,4-pentadienoic acid, and muconic acid are typical, and esters of such acids such as the methyl, ethyl, isopropyl, tertiary butyl, 2-ethylhexyl, decyl and like esters. 1-cyano-1,3-butadiene, 3-nitro-1,3-butadiene, 3-vinyl-3-sulfolene and the like are examples of other suitable substituted conjugated diethylenic compounds which can be used to prepare esters of ethylenic diols by reaction with an alpha-peroxy-substituted cyclic ether and redox reducing agent according to the invention. Preferred dienes are those having 4 to 18 carbon atoms per molecule. Mixtures of two or more starting ethylenic compounds with a single alpha-peroxy cyclic ether or a mixture of such ethers can be used but, as a rule, it is preferred to react a single ethylenic compound with a single alpha-peroxy cyclic ether as recovery and purification of single products or simple mixtures are usually facilitated in such cases.

By the use of the preferred dienes in the new process, the invention provides new diesters of long-chain unsaturated diols having two non-conjugated ethylenic double bonds of the formula

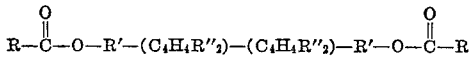

wherein

is an acyl group of a carboxylic acid having 1 to 18 carbon atoms, R' is an acyclic saturated hydrocarbon radical having at least four carbon atoms, preferably four to nine carbon atoms, separating the carboxy and ($C_4H_4R''_2$) groups, and R is hydrogen, halogen, alkyl, aryl or aralkyl. These diesters are readily hydroxylyzed to the corresponding diols. Specific diols obtainable in this way which are a feature of the present invention include, in addition to those formed by hydrolysis of the esters of the examples, the primary diols: 7,11-octadecadiene-1,18-diol from butadiene and 2-hydroperoxy-1-oxacyclohexane, 8,9 - dimethyl - 6,10 - hexadecadiene-1,16-diol from 2-hydroperoxytetrahydropyran and 1,3-pentadiene, 6,7,10,11 - tetramethyl - 6,10-hexadecadiene-1,16-diol from 2-hydroperoxytetrahydropyran and 2,3-dimethyl butadiene, 6,10-diphenyl-6,10-hexadecadiene-1,16-diol from 2-phenyl-1,3-butadiene and 2-hydroperoxytetrahydropyran, 9,13-docosadiene-1,22-diol from 2-hydroperoxy-1-oxacyclononane and butadiene, and 10,14-dimethyl-10,14-tetraacosadiene-1,24-diol from 2-hydroperoxyl - 1 - oxacyclodecane and isoprene. Secondary and tertiary diols also forming a part of the invention include 7,11-octadecadiene-2,17-diol from butadiene and 2-hydroperoxy-6-methyltetrahydropyran, 8,12-dimethyl-8,12-eicosadiene-3,18-diol from isoprene and 2-hydroperoxy-6-ethyltetrahydropyran, 13,17 - triacontadiene-7,23-diol from butadiene and 2-hydroperoxy-6-heptyltetrahydropyran, 1,16 - diphenyl- 6,10 - hexadecadiene-2,15-diol from butadiene and 2-hydroperoxy-6-phenyltetrahydropyran, 10,14-tetracosadiene-10,14-dichloro-5,20-diol from chloroprene and 2-hydroperoxy-6-butyltetrahydropyran, 2,17-dimethyl-7,11-octadecadiene-2,17-diol from butadiene and 2 - hydroperoxy - 6,6 - dimethyltetrahydropyran, 4,17-dimethyl-8,12-eicosadiene-4,17-diol from butadiene and 2-hydroperoxy-5-methyl - 5 - propyltetrahydrofuran, and 2,24-dimethyl-10,14-tetracosadiene-2,24-diol from butadiene and 2-hydroperoxy-2,9,9-trimethyl-1-oxacyclononane.

These diols are valuable intermediates in the manufacture of polycarboxylic acid polyesters which give fibers and films having desirable properties. In the form of monomeric mono- and di-esters of carboxylic acids they are useful plasticizers for resins. The tertiary diols in particular are readily dehydrated to tetraenes which are useful intermediates in the production of hydrocarbon polymers having good electrical resistance. The diols, especially the primary diols, can be oxidized to long chain dicarboxylic acids having the carboxyl groups in the place of the carbinol groups, these dicarboxylic acids being particularly useful components of alkyd resins.

A particularly desirable sub-class of the new diols of the invention are those having a vinyl group attached at an intermediate position on the ethylenically unsaturated chain linking the two carbinol groups. These diols undergo peroxide-catalyzed polymerization or copolymerization with other ethylenic compounds such as vinyl chloride, methyl methacrylate, styrene, etc. to produce valuable resinous materials. This polymerization provides one advantageous method of separating these compounds from the isomeric compounds having the ethylenic groups exclusively in the main chain which are formed along with the vinyl-substituted diols. The resulting hydroxy polymers can be cured by cross-linking with diisocyanates and esterified with sulfuric or phosphoric acid to produce ion exchange resins. Representative examples of vinyl-substituted ethylenic diols of this kind are: 6-vinyl-8-tetradecene-1,14-diol from butadiene and 2-hydroperoxytetrahydropyran, 6-vinyl-6,8-dimethyl-8-tetradecene-1,14-diol from isoprene and 2-hydroperoxytetrahydropyran, 5,7-dimethyl-6-vinyl- and 5,10-dimethyl-6-vinyl-8-tetradecene-1,14-diol from 1,3-pentadiene and 2-hydroperoxytetrahydropyran, 6-isopropenyl-6,8,9-trimethyl-8-tetradecene-1,14-diol from 2,3-dimethyl-1,3-butadiene and 2-hydroperoxytetrahydropyran, 2,17-dimethyl-8-vinyl-10-octadecene-3,16-diol from butadiene and 2-hydroperoxy-6-isopropyltetrahydropyran, 3,12-diphenyl-6-venyl-8-tetradecene-1,14-diol from butadiene and 2-hydroperoxy-4- phenyltetrahydropyran, 9,11-dichloro-9-vinyl-11-eicosadiene-4,17-diol from chloroprene and 2-hydroperoxy-6-propyltetrahydropyran, and 6,17-dimethyl-10-vinyl-12-docosadiene-5,18-diol from butadiene and 2-hydroperoxy-5-methyl-5-pentlytetrahydrofuran.

I claim as my invention:

1. A process for coupling an alpha-peroxy cyclic ether having 4 to 18 carbon atoms and not more than two oxygen atoms in the ring and an ethylenic compound which comprises contacting said alpha-peroxy cyclic ether with an ethylenic compound free from groups more reactive than the ethylenic unsaturation in the presence of a redox reducing agent.

2. A coupling process which comprises reacting an ethylenic compound free from groups more reactive than the ethylenic unsaturtion with an alpha-peroxy cyclic ether having 4 to 18 carbon atoms and not more than two oxygen atoms in the ring to unite a ring carbon of said ether directly to a carbon atom of the of the ethylenic compound by contacting said peroxy ether and ethylenic compound in the presence of a redox reducing agent.

3. A process for producing a carboxylic acid ester of an alcohol which comprises contacting an alpha-peroxy cyclic ether having 4 to 18 carbon atoms and not more than two oxygen atoms in the ring with an ethylenic compound free from groups more reactive than the ethylenic unsaturation in the proportions of about 1 to about 5 moles of ethylenic compound per mole of said ether in the presence of a substantially stoichiometric proportion of redox reducing agent.

4. A process for producing a carboxylic acid ester of a diol which comprises contacting an alpha-peroxy cyclic ether having 4 to 18 carbon atoms and not more than two oxygen atoms in the ring with an ethylenic compound free from groups more reactive than the ethylenic unsaturation in the presence of a redox reducing agent, and recovering from the reaction mixture an ester containing a number of carbon atoms per molecule which is equal to twice the sum of the number of carbon atoms in said ether and said ethylenic compound.

5. A process for producing a carboxylic acid ester of a diol which comprises contacting a 2-hydroperoxy cyclic ether having 4 to 18 carbon atoms and a single oxygen atom in the ring with an ethylenic compound free from groups more reactive than the ethylenic unsaturation in the presence of a redox reducing agent.

6. A process in accordance with claim 5 wherein the redox reducing agent is ferrous sulfate.

7. A process for producing an ethylenic diol which comprises contacting an alpha-peroxy cyclic ether having 4 to 18 carbon atoms and not more than two oxygen atoms in the ring with a conjugated diene free from groups more reactive than the ethylenic unsaturation in the presence of a redox reducing agent and hydrolyzing the resulting ester.

8. A process for producing a carboxylic acid diester of a diol having an aliphatic hydrocarbon chain of 16 carbon atoms containing two non-conjugated ethylenic double bonds linking the hydroxy groups which comprises contacting a 2-hydroperoxytetrahydropyran with a 1,3-conjugated diene in the presence of a redox reducing agent.

9. A process for producing a diformate of a 6,10-hexadecadiene-1,16-diol which comprises contacting butadiene and a redox reducing agent with a 2-hydroperoxytetrahydropyran having a hydrogen atom attached to ring carbon atoms in the No. 2 position and two hydrogen atoms attached to the ring carbon atom in the No. 6 position.

10. A process for producing 1,16-diformoxy-6,10-hexadecadiene and 1,12-diformoxy-6-dodecene which comprises contacting butadiene and 2-hydroperoxytetrahydropyran in a mole ratio of about 1:1 to about 5:1 with approximately a stoichiometric proportion of ferrous sulfate.

11. A process for producing a carboxylic acid ester of an alcohol which comprises contacting an alpha-peroxy cyclic ether having 4 to 18 carbon atoms and not more than two oxygen atoms in the ring wth an alpha-methyl substituted vinyl compound in the presense of a redox reducing agent.

12. A process for producing a carboxylic acid diester of a saturated carbonyl-substituted diol which comprises contacting an alpha,beta-monoethylenic carbonyl compound with an alpha-peroxy cyclic ether having 4 to 18 carbon atoms and not more than two oxygen atoms in the ring in the presence of a redox reducing agent.

13. A process in accordance with claim 12 wherein the monoethylenic compound is dimethyl maleate.

14. A process for producing a carboxylic acid diester of a diol which comprises contacting a monoethylenic hydrocarbon having an aromatic ring directly linked to a carbon atom of the ethylenic group with an alpha-peroxy cyclic ether having 4 to 18 carbon atoms and not more than two oxygen atoms in the ring in the presence of a redox reducing agent.

15. A process in accordance with claim 14 wherein the monoethylenic hydrocarbon is alpha-methyl styrene.

16. A process for producing a carboxylic acid diester of a cyano-substituted saturated diol which comprises contacting a monoethylenic nitrile having the cyano group directly linked to a carbon atom of the ethylenic group with an alpha-peroxy cyclic ether having 4 to 18 carbon atoms and not more than two oxygen atoms in the ring in the presence of a redox reducing agent.

References Cited in the file of this patent

UNITED STATES PATENTS

| 2,601,224 | Roedel | June 24, 1952 |
| 2,669,579 | Urban | Feb. 16, 1954 |
| 2,680,713 | Lindsey et al. | June 8, 1954 |
| 2,757,192 | Jenner | July 31, 1956 |
| 2,757,210 | Jenner | July 31, 1956 |